(12) United States Patent
Chinavanichkit et al.

(10) Patent No.: US 11,669,869 B2
(45) Date of Patent: *__Jun. 6, 2023__

(54) ADVERTISING DELIVERY CONTROL SYSTEM

(71) Applicant: Quantcast Corporation, San Francisco, CA (US)

(72) Inventors: Maytee Chinavanichkit, Singapore (SG); Andy Purnama Prapanca, Singapore (SG); Duy Hoang Nguyen, Singapore (SG)

(73) Assignee: Quantcast Corporation, San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/396,732

(22) Filed: Aug. 8, 2021

(65) Prior Publication Data

US 2021/0365996 A1 Nov. 25, 2021

Related U.S. Application Data

(63) Continuation of application No. 15/378,827, filed on Dec. 14, 2016, now Pat. No. 11,087,364.

(51) Int. Cl.
*G06Q 30/00* (2023.01)
*G06Q 30/0273* (2023.01)
*G06Q 30/0242* (2023.01)

(52) U.S. Cl.
CPC ..... *G06Q 30/0275* (2013.01); *G06Q 30/0244* (2013.01)

(58) Field of Classification Search
None
See application file for complete search history.

(56) References Cited

U.S. PATENT DOCUMENTS 7,860,995 B1 * 12/2010 Singh .................... G06Q 30/02
709/246
7,908,238 B1 * 3/2011 Nolet .................... G06N 7/005
706/52

(Continued)

OTHER PUBLICATIONS

Kridel; Adaptive Modeling for Real Time Analyti; ICSS 2015; pp. 887-896; 2015.*

(Continued)

*Primary Examiner* — Radu Andrei
(74) *Attorney, Agent, or Firm* — Andrea Wheeler

(57) ABSTRACT

A dynamically regulated advertising delivery control system. A campaign is operated by sending bids to an exchange responsive to receiving bid requests from the exchange, each bid request representing an opportunity to expose a browser to content. Won bid notifications are received from the exchange and exposure notifications are received from exposed browsers. Failed exposures are detected by detecting won bid notification identifiers without corresponding exposure notification identifiers. Responsive to the failed exposures exceeding an upper limit, the campaign is operated in a throttled mode by sending bids to the exchange in response to a fraction of the suitable bid requests received from the exchange and ignoring some suitable bid requests. Responsive to detecting successful exposures in the throttled mode, the operation of the campaign is dynamically regulated by increasing the fraction.

21 Claims, 4 Drawing Sheets

(56) References Cited

U.S. PATENT DOCUMENTS

| | | | | |
|---|---|---|---|---|
| 7,933,798 B1* | 4/2011 | Yan | | G06Q 40/12 |
| | | | | 705/14.42 |
| 8,700,945 B1* | 4/2014 | Allen | | G06F 11/076 |
| | | | | 714/4.11 |
| 9,727,873 B1* | 8/2017 | Wood | | G06Q 30/02 |
| 2003/0224777 A1* | 12/2003 | Sakuma | | H04W 24/00 |
| | | | | 455/423 |
| 2006/0224496 A1* | 10/2006 | Sandholm | | G06Q 30/02 |
| | | | | 705/37 |
| 2007/0011503 A1* | 1/2007 | Kitani | | H04B 1/406 |
| | | | | 714/704 |
| 2007/0239737 A1* | 10/2007 | Dudley | | H04L 51/58 |
| 2007/0274496 A1* | 11/2007 | Singh | | H04M 3/487 |
| | | | | 379/210.02 |
| 2008/0034258 A1* | 2/2008 | Moriya | | G05B 23/0297 |
| | | | | 714/57 |
| 2008/0154717 A1* | 6/2008 | Saifee | | G06Q 30/0263 |
| | | | | 705/14.69 |
| 2009/0037513 A1* | 2/2009 | Yoda | | H04N 1/00217 |
| | | | | 709/201 |
| 2009/0055267 A1* | 2/2009 | Roker | | G06Q 30/02 |
| | | | | 705/14.1 |
| 2009/0089151 A1* | 4/2009 | Protheroe | | G06Q 30/0273 |
| | | | | 705/14.69 |
| 2010/0161417 A1* | 6/2010 | Mitsui | | G06Q 30/0273 |
| | | | | 705/14.54 |
| 2013/0073413 A1* | 3/2013 | Bhogal | | G06Q 30/08 |
| | | | | 705/26.3 |
| 2013/0275802 A1* | 10/2013 | Endo | | G06F 11/1076 |
| | | | | 714/6.23 |
| 2014/0074644 A1* | 3/2014 | Nam | | G06Q 30/08 |
| | | | | 705/26.3 |
| 2014/0095324 A1* | 4/2014 | Cabral | | G06Q 30/08 |
| | | | | 705/14.71 |
| 2015/0154631 A1* | 6/2015 | Umeda | | G06Q 30/0243 |
| | | | | 705/14.42 |
| 2015/0021351 A1 | 7/2015 | Rao et al. | | |
| 2015/0213510 A1* | 7/2015 | Rao | | G06Q 30/0275 |
| | | | | 705/14.71 |
| 2015/0332310 A1* | 11/2015 | Cui | | G06Q 30/0275 |
| | | | | 705/14.45 |
| 2015/0332317 A1* | 11/2015 | Cui | | G06Q 50/01 |
| | | | | 705/14.46 |
| 2015/0339728 A1* | 11/2015 | Sura | | G06Q 30/0277 |
| | | | | 705/14.73 |
| 2015/0339730 A1* | 11/2015 | Endo | | G06Q 30/0275 |
| | | | | 705/14.71 |
| 2015/0379566 A1* | 12/2015 | Hummel | | G06Q 30/0275 |
| | | | | 705/14.52 |
| 2016/0277516 A1* | 9/2016 | Hummel | | H04L 67/53 |
| 2016/0314756 A1* | 10/2016 | Li | | G06Q 30/0277 |
| 2017/0091828 A1* | 3/2017 | Siegler | | G06Q 30/0269 |
| 2017/0293933 A1* | 10/2017 | Edwards | | G06Q 30/0246 |
| 2018/0025389 A1* | 1/2018 | Arora | | H04W 4/23 |
| | | | | 705/14.43 |
| 2018/0357672 A1* | 12/2018 | Kim | | H04W 4/021 |

OTHER PUBLICATIONS

Kuang-Chih; Real Time Bid Optimization with Smooth Budget Delivery in Online Advertising; Turn Inc 2013; 13 pages; 2013.*

Shuai Yuan; Real Time Bidding for Online Advertsing; ACM 2013; 8 pages; 2013.*

Kridel, D. et al., "Adaptive Modeling for Real Time Analytics: The Case of 'Big Data' in Mobile Advertising," 2015 48th Hawaii International Conference on System Sciences, Jan. 2015, pp. 887-896.

Lee, K.-C. et al., "Real Time Bid Optimization with Smooth Budget Delivery in Online Advertising," Turn 2013, May 14, 2013, pp. 1-13.

Yuan, S. et al., "Real-time Bidding for Online Advertising: Measurement and Analysis," ACM 2013, Jun. 27, 2013, pp. 1-8.

United States Office Action, U.S. Appl. No. 15/378,827, filed Dec. 24, 2020, 17 pages.

United States Office Action, U.S. Appl. No. 15/378,827, dated Jul. 2, 2020, 16 pages.

United States Office Action, U.S. Appl. No. 15/378,827, dated Mar. 23, 2020, 17 pages.

United States Office Action, U.S. Appl. No. 15/378,827, dated Jul. 29, 2019, 23 pages.

United States Office Action, U.S. Appl. No. 15/378,827, dated Mar. 11, 2019, 18 pages.

* cited by examiner

ADVERTISING DELIVERY CONTROL SYSTEM

RELATED

This application is a continuation of U.S. patent application Ser. No. 15/378,827, filed Dec. 14, 2016, all of which is incorporated by reference herein in its entirety.

TECHNICAL FIELD

This invention pertains in general to control systems and in particular to regulating campaign operations in a real time bidding environment.

DESCRIPTION OF RELATED ART

In a real-time bidding environment of an Internet exchange, automated bidders operate on behalf of advertisers to purchase opportunities to expose entities (e.g. browsers) to advertising. Typically, each individual auction is resolved in milliseconds and millions of auctions take place every second. A number of different persistent or intermittent problems can result in the improper operation of automated campaigns. For example, an opportunity may be properly purchased, but a network connectivity issue, a misconfigured ad server or a corrupt advertising creative may prevent an advertising creative from being displayed to a browser, resulting in wasted budget. To address this problem, in some cases, an advertiser can receive delivery notifications to track the delivery of their advertising creatives. For example, an advertising creative can be configured to send a request to the advertiser when the advertising creative is rendered on a screen. The request lets the advertiser know that the advertising creative has been delivered to a recipient. By accounting for the number of bids won in a real-time bidding environment and attempting to correlate the won bids with delivery notifications, an advertiser can detect problems and take action to avoid spending on unproductive opportunities, such as halting bidding for a campaign until problems are resolved. However, it can take a long time for problems to be detected, and while the problematic campaign is operating, it is spending advertising budget and consuming scarce advertising opportunities without benefit. Furthermore, while halting a campaign stops unproductive spending, delays in restarting a campaign prevent an advertiser from achieving their advertising goals, such as reach goals (e.g. the number of unique browsers exposed to the advertising content) and frequency goals (e.g. achieving the optimal number of exposures to advertising content per unique browser in a time window). What is needed is a way for an exchange participant to carefully manage their automated campaigns to limit the risk associated with poorly configured campaigns or intermittent problems as well delays in delivery, enabling an exchange participant to meet their delivery goals and make the best use of advertising budgets and scarce, high value advertising opportunities.

SUMMARY

Embodiments of the invention include a method, a non-transitory computer-readable storage medium and a system for operating an advertising campaign by a campaign control system. Bid requests are received by the campaign control system from an exchange. Each bid request represents an opportunity to expose an entity, such as a browser, to content such as advertising content. The campaign control system can operate multiple advertising campaigns on behalf of multiple advertisers. A bid request's opportunity may be suitable for one or more advertising campaigns operated by the campaign control system. Bids are sent from the campaign control system to an exchange responsive to receiving bid requests from the exchange. Each bid comprises a non-zero bid price and may further comprise advertising content, instructions for accessing advertising content, an identifier, such as a bid identifier, or combinations thereof. The campaign control system may not bid on all bid requests, or may send a response to the exchange including a "no bid" indication instead of a bid. Won bid notifications are received at the campaign control system from the exchange, with each won bid notification comprising an identifier, such as a bid identifier, a bid request identifier, an opportunity identifier, a campaign identifier, an identifier assigned by the campaign control system, an identifier assigned by the exchange, a recipient identifier or combinations thereof. A stream of exposure notifications is received at the campaign control system from entities such as exposed browsers, with each exposure notification comprising an identifier. Failed exposures are detected at the campaign control system by detecting won bid notification identifiers without corresponding exposure notification identifiers. Responsive to the volume of failed exposures exceeding an upper limit for a component of the Internet advertising environment, such as a publisher, the operation of the campaign is throttled by ignoring some bid requests associated with the dysfunctional component (such as the dysfunctional publisher). For example, bids (i.e. bid responses having a non-zero bid price) may only be sent to the exchange on behalf of the throttled campaign for a fraction of the bid requests received from the exchange which are suitable for the throttled campaign and associated with the dysfunctional publisher. In other words, the campaign bids on fewer bid requests associated with the dysfunctional publisher on behalf of the campaign in the throttled mode compared to the unthrottled mode. The operation of the advertising campaign is dynamically regulated. Responsive to detecting a minimum volume of successful exposures associated with the dysfunctional component of the Internet advertising environment (e.g. a dysfunctional publisher) in the throttled mode, the fraction is increased, so that bids associated with the dysfunctional component are sent to the exchange on behalf of the throttled campaign for the increased fraction of the bid requests. Embodiments of the invention can automatically regulate the operation of a campaign with respect to a publisher, automatically throttling advertising spend associated with a publisher if failed exposures associated with a publisher exceed an upper limit, and dynamically ramping up advertising spend associated with the publisher in response to detecting a volume of successful exposures associated with the problematic publisher.

The campaign control system can enable the Internet advertising environment as a whole to operate more efficiently. The high quality opportunities to expose entities to advertising are scarce. Throttling bidding associated with problematic components of the Internet advertising environment, such as a dysfunctional campaign, avoids wasting scarce inventory on the dysfunctional campaign, enabling other campaigns to bid on the scarce inventory. Similarly, throttling bidding related to a problematic resource (e.g. a dysfunctional ad server), conserves advertising budgets. Automated recovery means that scarce inventory can be quickly and efficiently returned to the environment when problems are resolved. Importantly, the automated throttling and automated recovery techniques of the invention cannot sensibly be executed manually due to the fast-paced nature of the online advertising environment.

For some embodiments of the invention, the operation of the advertising campaign is dynamically regulated according to a fraction of advertising spend (i.e. spending only a fraction of the advertising budget in the throttled mode, and increasing the fraction of the advertising budget which is spent after detecting a minimum volume of successful exposures) instead of or in addition to regulating according to a fraction of the bid requests received from the exchange which are suitable for the campaign.

Embodiments of the computer-readable storage medium store computer-executable instructions for performing the steps described above. Embodiments of the campaign control system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention rapidly detect problems in the Internet advertising environment (e.g. dysfunctional resources such as an automated bidder, an exchange, an ad server, a publisher) and conserve advertising budget by throttling bidding associated with the problematic resource. In the throttled mode, the campaign control system bids (i.e. responds to a bid request with a non-zero bid price) on fewer bid requests associated with the dysfunctional component of the Internet advertising environment than in the unthrottled mode. Advantageously, because automated throttling limits bidding associated with a problematic resource, but does not discontinue it completely, the campaign control system can be responsive, ramping up bidding with a previously dysfunctional resource responsive to detecting recovery and throttling the dysfunctional resource again if problems resurface. Accordingly, the campaign control system is capable of limiting financial losses due to dysfunctional components in the Internet advertising environment and also limiting the volume of lost opportunities which are wasted when bidding associated with a recovered component remains throttled or halted even after the recovered component is functional. For example, the campaign is automatically regulated and ramps up bidding activity associated with a throttled resource responsive to detecting a volume of successful exposures associated with the throttled resource.

Embodiments of the invention are described below in the context of a real-time bidding exchange for opportunities to display advertisements to users through their web browsers. It is noted that similar techniques as those described below can be used in targeting advertisements to recipients in the context of other kinds of auctions and exchanges systems, for use with browser-based advertisements or other types of networked media as well. Such techniques are particularly useful where rapid decisions regarding advertisement opportunities are desirable.

Figure 1:
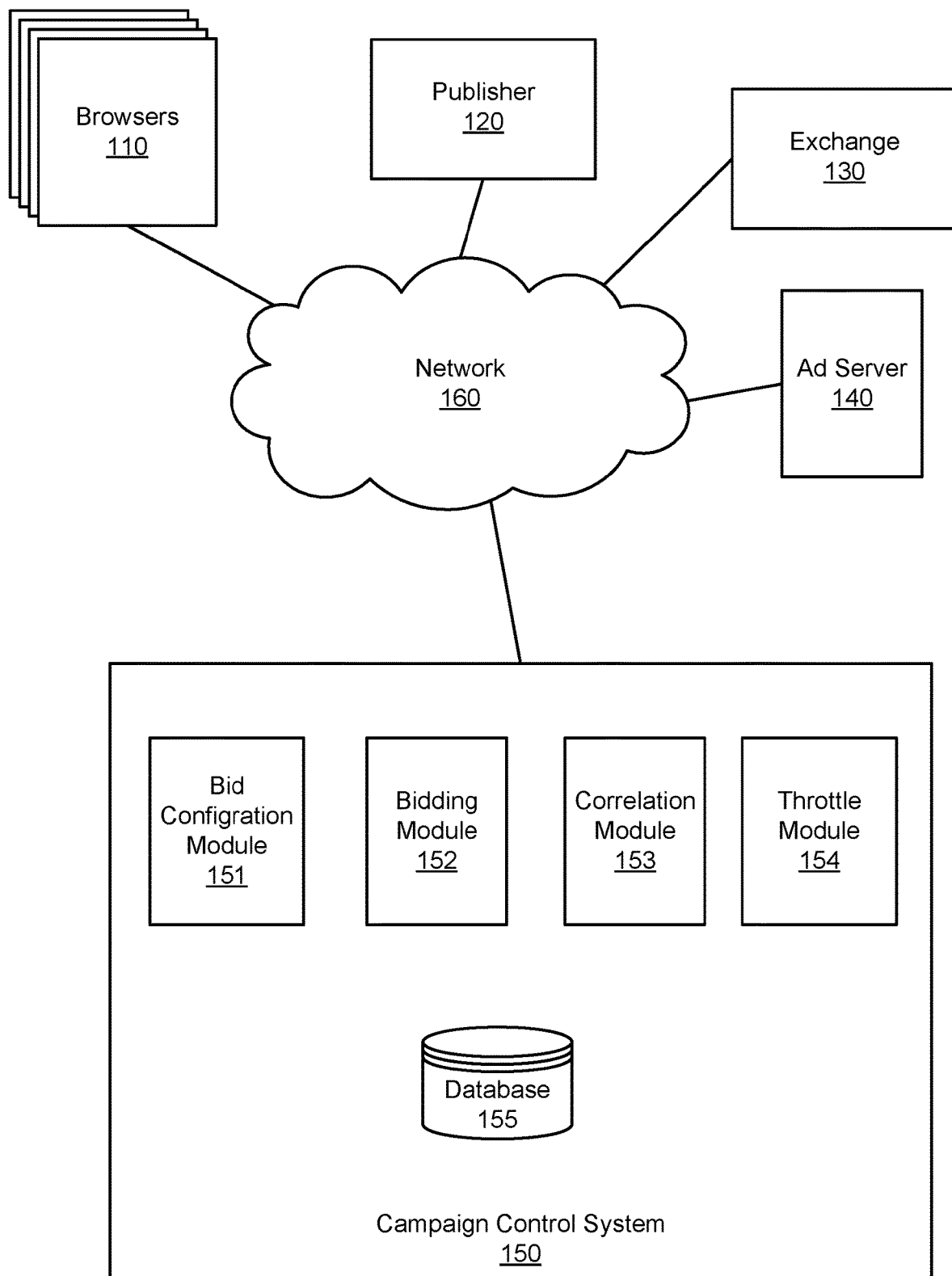
FIG. 1 is a high-level block diagram of a computing environment for a campaign control system, in accordance with an embodiment of the invention.

FIG. 1 is a high-level block diagram of a computing environment for a campaign control system 100, in accordance with an embodiment of the invention. The computing environment includes users' browsers 110, a publisher 120, an exchange 130, an ad server 140, and a campaign control system 150. These elements are connected by a communications network 160, such as a local area network, a wide area network, a wireless network, an intranet, a cable network, a satellite network, a cellular phone network, an optical network, the Internet or combinations thereof. Although only one publisher 120, one exchange 130, and one ad server 140 are illustrated in FIG. 1, the environment can comprise a plurality of publishers, exchanges, ad servers or combinations thereof.

A recipient can be an application such as a user's browser 110. A browser 110 can be a web browser executing on a user device, such as a desktop computer or a mobile phone, as the users of those devices browse the web. A recipient can represent a networked consumer and can be a device (e.g. a mobile device, wearable device or a desktop computer) or an application (e.g. a cell phone game, cell phone application). For example, an application can be executed on a user device, such as a personal computer, laptop computer, tablet computer, smartphone, a specialized hardware gaming device and a wearable device. A recipient can be associated with an anonymous identifier, such as a device identifier, application identifier or both.

Examples of recipients can include software installations or hardware devices used to access content over a network or combinations thereof. Software installations can include a web browser instance, video viewer instance or set-top box software residing on a hardware device. A hardware device can comprise a computer, personal digital assistant (PDA), cell phone, a networked gaming device, an augmented reality (AR) system or set-top unit (STU) such as a STU used in conjunction with cable television service. In some cases, a recipient can represent an individual person, such as an end-user of an application and in other cases a recipient represents a combination of individuals which are logically grouped together, such as but not limited to a family, a household, a social network, a business, a department, or a team, such as a group of end-users sharing software and/or hardware resources.

A variety of methods exist for associating an anonymous identifier with a recipient. For example, a hardware device identifier such as a Media Access Control Address (MAC address), an International Mobile Station Equipment Identity (IMEI), a Mobile Equipment Identifier (MEID), or an Electronic Serial Number (ESN) can be stored on a device operated by a user to access content over a network. As another example, a software identifier such as a cookie value, an application identifier, an application installation identifier, or an operating system identifier such as an Android_ID or Unique Device ID (UDID) can be locally stored. In other embodiments, identifiers can be composed and/or stored remotely from a device associated with a recipient. In some cases, a recipient, such as a browser 110, can have multiple identifiers, such as multiple first party cookies and multiple third party cookies, which can be used to identify the browser 110 to various systems.

Recipients, such as browsers 110 which receive content, such as a web page or advertising content, from a publisher 120, such as a website, can also be called a visitor to that publisher (e.g. a website visitor). A publisher 120 sends content to a recipient, such as a browser 110, over a network 160. In some cases, content may be streamed from a publisher 120 to a recipient such as a browser 110. A web page, advertising content, audio content, video content, multimedia content, and downloadable software are examples of content. A browser 110 can receive content from a variety of sources such as a publisher 120, an exchange 130, and an exchange 130. Although only one publisher 120, one exchange 130, and one ad server 140 are illustrated in FIG. 1, the environment can comprise a plurality of publishers, exchanges, ad servers or combinations thereof.

The users' browsers 110 are web browsers executing on user devices, such as personal computers, laptop computers, tablet computers, and smartphones, as the users of those devices browse the web. A variety of methods exist for associating an anonymous identifier with a web browser. For example, a hardware device identifier such as a Media Access Control Address (MAC address) which can be stored on a device operated by a user to access content over a network. As another example, a software identifier such as a cookie value can be locally stored. In other embodiments, identifiers can be composed and/or stored remotely from a device associated with the user. In some cases, a browser can have multiple identifiers, such as multiple first party cookies and multiple third party cookies, which can be used to identify the browser to various systems.

Ad server 140 can send advertising content to browsers 110 on behalf of an advertiser. For example, as a user operates browser 110 and navigates to a publisher's website that includes ad slot to be auctioned through an ad exchange 130, the publisher 120 sends instructions to the browser 110 for accessing content to be displayed on the website, including a coded link known as an "ad tag" that points to an exchange 130. The browser 110 uses the ad tag to contact the exchange 130 with a request for advertising content suitable for the ad slot. The request may comprise information such as: a browser identifier (e.g. a cookie), an identifier received from the ad exchange 130, an ad slot size (e.g. the dimensions of the ad slot), the type of ad slot (e.g. banner, video), information about the context of the ad slot (e.g. website topic, the URL on which the ad will be delivered), the location of the ad slot within a webpage, or combinations thereof.

The exchange 130 receives the request for the advertising content from the browser 110 and starts an auction by sending a bid request to potential bidders of the bidding opportunity. In some cases, information can be included with the bid request such as a browser identifier and other data describing the bid opportunity, such as, for example, the URL on which the ad will be delivered, the topic of the webpage on which the advertising content will appear, site visit frequency, the dimensions of the ad slot, information regarding the ad slot's location in the web page (e.g. above the fold, below the fold) or combinations thereof. In some cases, the bid request can comprise a bid request identifier. In some cases, the exchange may maintain or access a mapping which maps identifiers known to the exchange (e.g. an identifier assigned by the exchange to a browser 110, an identifier received at the exchange from the recipient) to identifiers known to the campaign control system 150 (e.g. a third party cookie assigned to a recipient such as browser 110 by the campaign control system 150); in some examples, the exchange may receive a first identifier from the recipient (e.g. browser 110), determine one or more mapped identifiers from the first identifier, and send some or all of the mapped identifiers to the campaign control system 150.

Bidders submit their bids to the exchange 130. The bids can comprise a bid price, one or more identifiers (e.g. an identifier received in the bid request, an identifier selected or assigned by the campaign control system, a campaign identifier), advertising content, an ad redirect (e.g. instructions to request the advertising content from an ad server such as ad server 140), or combinations thereof. In some cases, an advertising campaign may use multiple ad servers. For example, an array of ad servers may be geographically distributed for load balancing purposes and to address network latency issues. The ad server which is most suitable for the ad slot may be selected and included in the bid. In some cases, an ad redirect may include an identifier, such as an identifier received from the exchange, an identifier received from the recipient (e.g. browser 110), an identifier set by the campaign control system 150 or combinations thereof. The ad redirect can be configured so that the recipient (e.g. browser 110) sends an identifier to the campaign control system 150 as part of the advertising content display process (e.g. responsive to receiving the advertising content, responsive to displaying the advertising content).

The exchange 130 determines the auction winner from the submitted bids. In some implementations, the ad exchange 130 may send a notification to the winner and/or the other bidders. The notification may include an indication of whether the bidder won the auction (e.g. a won bid notification), and may confirm the amount that the winner will be charged for buying the ad placement, which is some cases is the amount of the second highest bid. In some cases, a notification, such as a won bid notification, can comprise one or more identifiers such as an identifier of the browser 110, an identifier received by the campaign control system 150 in a bid request, and an identifier assigned or selected by the campaign control system 150. In some cases, the exchange 130 sends advertising content or an ad redirect to the browser 110, and may send one or more identifiers (e.g. an identifier of the browser 110, an identifier received by the campaign control system 150 in a bid request, and an identifier assigned or selected by the campaign control system 150). The browser 110 can use an ad redirect to request advertising content. For example, an ad redirect can comprise instructions to request advertising content from an ad server 140, and the browser 110 can subsequently receive advertising content from the ad server 140. In some cases, the browser 110 can send an ad server 140 one or more identifiers received from the exchange 130.

Figure 2:
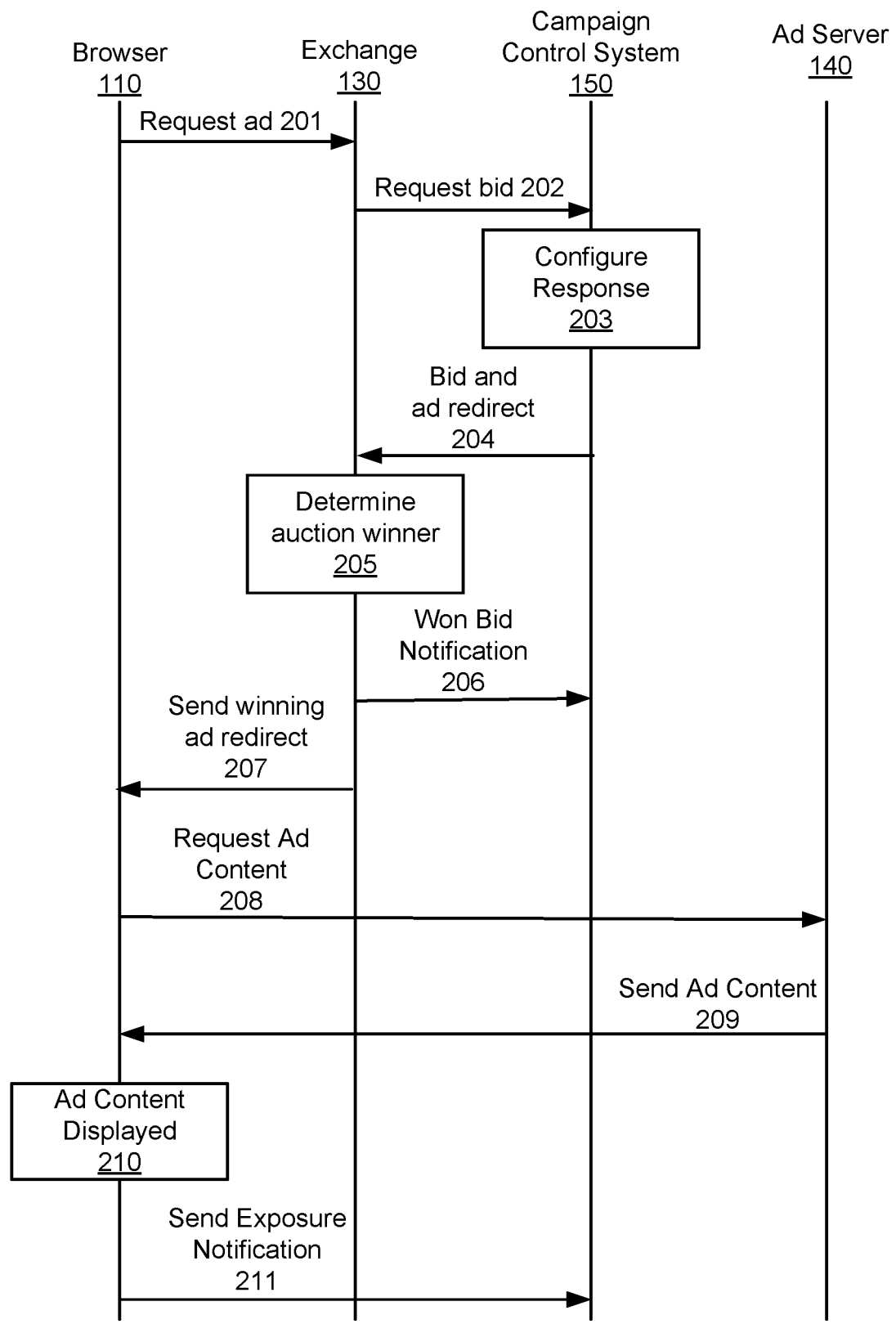
FIG. 2 is an interaction diagram illustrating a flow of information, in accordance with an embodiment of the invention.

FIG. 2 is an interaction diagram illustrating a flow of information, in accordance with an embodiment of the invention. It is noted that FIG. 2 is merely illustrating an example of a real-time bidding environment, and the interactions depicted in FIG. 2 may vary in other examples.

In the scenario illustrated in FIG. 2, as a user operates browser 110 and navigates to a publisher's website that includes ad slot to be auctioned in an ad exchange 130, the publisher's web server sends instructions to the browser 110 for accessing content to be displayed on the website, including a coded link known as an "ad tag" that points to an exchange 130. The browser 110 uses the ad tag to contact the exchange 130 with a request for advertising content in step 201. In some cases, one or more identifiers can be sent by the browser in step 201 such as a browser identifier, an application installation identifier, or a hardware identifier. For example, the browser may send an identifier previously set by the exchange 130 (e.g. an exchange cookie).

The ad exchange 130 receives the request for the ad from the browser 110 and reads the identifier. In response, the ad exchange starts the auction by sending a bid request to the campaign control system 150 in step 202 and to other servers to notify potential bidders of the bidding opportunity. Included with the bid request is an identifier (e.g. an identifier of the browser 110 such as an exchange identifier set by exchange 130 or a mapped identifier) and other data describing the bid opportunity, such as, for example, the URL on which the ad will be delivered, the topic of the webpage on which the ad will appear, site visit frequency, and/or the dimensions of the ad slot.

The campaign control system 150 receives the request for the bid, and configures a bid or response in step 203. In some cases, a campaign control system 150 may operate multiple campaigns simultaneously. Configuring a bid can comprise deciding if the advertising opportunity is suitable for any of the campaigns the campaign control system 150 is operating and determining a bid price. In some cases, identifiers, such as a bid identifier, a campaign identifier, an identifier received from the exchange 130, an identifier selected or assigned by the campaign control system 150, or combinations thereof may be selected for inclusion with the bid. A bid may further comprise advertising content or information on how to access advertising content from an ad server 140 such as an ad redirect which can be send to the browser 110 should the bid win the auction. The ad redirect provides instructions for redirecting the browser to an ad server 140 that will serve the ad for the advertising campaign that submitted the winning bid. As previously mentioned, an ad redirect may also comprise instructions for the recipient (e.g. browser 110) to send one or more identifiers to the campaign control system 150, which can serve as an exposure notification. In some cases, the campaign control system 150 may choose not to bid, and may not respond to the request for bid, or provide a response to exchange 130 comprising a "no bid" message.

In step 204, the bid is sent from the campaign control system 150 to the exchange 130. In this example, the bid comprises a bid price and an ad redirect (i.e. instructions for requesting advertising content from an ad server 140) as well as one or more identifiers.

In step 205, the exchange 130 determines an auction winner from the submitted bids.

In step 206, the exchange 130 may send a notification to the winner and/or the other bidders. The notification may include an indication of whether the bidder won the auction, and may confirm the amount that the winner will be charged for buying the opportunity to place an ad, which is some cases is the amount of the second highest bid. Additionally, the notification can include one or more identifiers.

In step 207, the ad exchange 130 sends the ad redirect included with the winning bid to the browser 110 as well as the identifier. The browser 110 uses the ad redirect to access the advertising content so that the user can request the advertising content in step 208. In some cases, one or more identifiers can be sent to the ad server in step 208. In step 209, the advertising content is sent from the ad server to the browser 110. The advertising content can be displayed on the browser in step 210. The advertising content, the ad redirect or both can be instrumented with instructions which cause the recipient (e.g. browser 110) to send an exposure notification to the campaign control system 150 in step 211. The exposure notification includes one or more identifiers.

In some implementations, the process illustrated in steps 201 through 211 of FIG. 2 can be executed in a few seconds. Ideally, the time passage between the browser 110 requesting the ad in step 201 and the user viewing the ad as it is displayed in step 210 is short enough not to impact the user's enjoyment of the publisher's website that the user is browsing. In other words, there is no noticeable lag to download and display the appropriate ad of the winning bidder in the auction.

The campaign control system 150 comprises a bid configuration module 151, a bidding module 152, a correlation module 153, a throttle module 154 and a database 155. The campaign control system 150 operates multiple advertising campaigns on behalf of advertisers in a real-time bidding environment of an Internet exchange. The campaign control system 150 purchases opportunities to expose recipients (e.g. browsers) to advertising content. Bid configuration module 151 can receive constraints such as budgeting instructions (e.g. total budget, target cost-per-mille (CPM), target spend rate) scheduling instructions (e.g. campaign duration, start date, end date), reach goals and/or targeting instructions which can be used to determine which bid requests are suitable for a particular campaign.

Bidding module 152 receives bid requests and creates bids which can each include a bid price and an advertising creative or instructions for accessing an advertising creative (e.g. an ad redirect). Bidding module 152 can determine which bid requests are suitable for a campaign. A campaign configuration can guide the determination with a characterization of the target recipient (e.g. target demographic, target geolocation, etc.), target context (e.g. webpage topic where the advertising creative will be displayed), or both. In some cases, a model may be applied to information received in the bid request, a history of the intended recipient associated with the bid request or both, and the results of applying the model may be used to select suitable bid requests which represent advertising opportunities which are most likely to contribute to a conversion for a particular campaign.

In some cases, a campaign control system 150 may operate a plurality of advertising campaigns on behalf of different advertisers and a bidding module 152 may select an advertising campaign from the multiple advertising campaigns which is most suitable for a particular bid request. A record of each bid request, bid or both may be kept in database 155. Each record may comprise one or more identifiers which can be used later to correlate bid requests, bids or both with status information or notifications which may be subsequently received by the campaign control system 150. Each record may further comprise a time stamp, such as the time stamp a bid request was received by the campaign control system 150, a time stamp received from the exchange 130, a time stamp a bid was sent to an exchange 130, or combinations thereof.

Correlation module 153 receives information from a resource such as an exchange 130, a browser 110, or a publisher 120 and correlates the information with a bid request received by the campaign control system 150, a bid sent by the campaign control system 150, a campaign, a browser 110, a publisher 120, an ad exchange 130, an ad server 140 or combinations thereof. In an example, information can comprise a "won bid" notification received from an exchange 130. The "won bid" notification can comprise identifiers such as a bid request identifier, a bid identifier, and a recipient identifier. The "won bid" notification can further confirm the amount that the campaign control system 150 will be charged for buying the ad placement. In an example, a browser 110 or a publisher 120 may send a request associated with the receipt or display of advertising content to a recipient such as browser 110.

Ideally, when an advertising exposure is successful, advertising content is provided to a recipient, such as a browser, for each won bid notification, and the campaign control system 150 receives an exposure notification from the recipient (e.g. browser 110), publisher 120, ad server 140, or combinations thereof. Correlation module 153 correlates each bid which resulted in a won bid with a "won bid" notification and an exposure notification. Information associated with the correlated exposure notification can be stored in the database 155, provided to the throttle module 154, or both.

A failed exposure is detected by detecting won bid notifications without corresponding exposure notifications. In some cases, a failed exposure is detected by detecting a won bid notification without a corresponding exposure notification within a time window. The correlation module 153 may detect failed exposures and determine one or more parameters associated with a failed exposure such as which component or components of the Internet advertising environment are associated with the failed exposures (e.g. the campaign associated with the failed exposure, the recipient (e.g. browser 110), the publisher 120, the ad exchange 130, the ad server 140, the advertising creative). The information associated with the failed exposure can be stored in the database 155, provided to the throttle module 154, or both.

Throttle module 154 receives threshold information which is used to configure throttling. Throttle module 154 detects failures in the Internet advertising environment and diagnoses dysfunctional components (e.g. components of the Internet advertising environment which are associated with too many failures to display advertising content). Responsive to detecting dysfunction, the throttle module 154 instructs the bidding module 152 to decrease bidding associated with the detected dysfunction. For example, throttle module 154 may be configured with a threshold to detect dysfunction. A threshold is associated with one or more components of the Internet advertising environment (e.g. a campaign, a recipient, a browser 110, an advertising creative, a publisher 120, an exchange 130, an ad server 140) and describes conditions required for the throttle module 154 to engage the throttle with respect to the dysfunctional component and reduce bidding. For example, a threshold may describe a volume of failed exposures in terms of a fraction (e.g. 20%) of the "won bids" associated with a particular campaign or publisher for a time segment (e.g. an hour, a day, elapsed time since a campaign began). In an example, a threshold may be expressed in terms of a number of failed exposures for a time segment or a cost of failed exposures (e.g. how much the failed exposures cost to buy) for a time segment.

Responsive to detecting dysfunction, the throttle module 154 can instruct the bidding module 152 to reduce the volume of bids to send with respect to the dysfunctional component. For example, if the throttle module 154 determines that a campaign is dysfunctional, the throttle module 154 may instruct the bidding module 152 to reduce the number of bids sent to the exchange 130 on behalf of the dysfunctional campaign by 95%. In another example, the amount of money spent by the bidding module 152 may be reduced by 95% instead of the number of bids. Advantageously, the throttle module 154 does not instruct the bidding module 152 to stop completely. The reduced bidding activity that is retained enables the campaign control system 150 to continually probe the Internet advertising environment and detect recovery and take advantage of the recovery quickly, enabling the system to make good use of scarce, high quality inventory.

The throttle module 154 can be configured with a threshold to detect recovery of a dysfunctional component and instruct the bidding module 152 to increase bidding associated with the dysfunctional component exhibiting recovery. Throttle module 154 detects recovery and responsive to detecting recovery, the throttle module 154 and instructs the bidding module 152 to increase bidding associated with the detected recovery. A recovery threshold is associated with a component of the Internet advertising environment (e.g. a campaign, a recipient, a browser 110, an advertising creative, a publisher 120, an exchange 130, an ad server 140) and describes conditions required for the throttle module 154 to open the throttle (i.e. increase bidding) with respect to the recovering component and increase bidding frequency. For example, a threshold may describe a volume of successful exposures in terms of a fraction (e.g. 50%) of the "won bids" associated with a particular recovering campaign or publisher for a time segment (e.g. an hour, a day, since the throttle was engaged). In another example, a threshold may be expressed in terms of a number of successful exposures for a time segment or a cost of successful exposures (e.g. how much the successful exposures cost to buy) for a time segment.

Responsive to detecting recovery, the throttle module 154 can instruct the bidding module 152 to increase bidding activity with respect to the dysfunctional component. For example, if the throttle module 154 determines that a campaign is recovering, the throttle module 154 may instruct the bidding module 152 to increase the number of bids sent to the exchange 130 on behalf of the recovering campaign by 10%. In another example, the amount of money spent by the bidding module 152 may be increased by 10% instead of the number of bids.

The throttle module 154 controls the flow of bids from the bidding module, decreasing the flow with respect to dysfunctional components responsive to detecting too many failed exposures and increasing the flow with respect to a dysfunctional component exhibiting recovery responsive to detecting enough successful exposures. In this way, the campaign control system 150 can limit the amount of money lost on failed exposures and also limit the duration of low campaign activity when dysfunctional components recover.

In some embodiments, responsive to detecting a dysfunctional campaign, the campaign control system 150 can limit spending on failed exposures related to the dysfunctional campaign without impacting the operation of other campaigns. In some embodiments, the campaign control system 150 can adapt to dysfunction without disrupting all delivery associated with a campaign. For example, responsive to detecting a dysfunctional advertising creative (e.g. the creative for a banner ad), the campaign control system 150 can limit spending on failed exposures which would invoke the dysfunctional advertising creative without impacting the operation of the same advertising campaign for exposures that would display other advertising creatives. For example, if the dysfunctional advertising creative is associated with a particular type of creative, such as a creative formatted for display in a banner ad slot, then bidding on bid requests associated with banner ad slots can be throttled, leaving bidding on bid requests associated with other types of ad slots unthrottled. In this case, spending can be limited with respect to the suitable advertising opportunities which are banner ad slots. In some cases, bidding related to different types of ad slots may be throttled independently (e.g. bidding on banner ad slots and bidding on skyscraper ad slots may be throttled independent of each other).

Responsive to detecting a dysfunctional ad server 140, the campaign control system 150 can limit spending on exposures which would use the dysfunctional ad server without disrupting spending on exposures which would use a different ad server. For example, a national advertising campaign may use multiple ad servers which are geographically distributed, with each ad server serving advertising content to a portion of the country (e.g., each ad server may be dedicated to a geographic region, a network subnet, or a range of IP addresses). Responsive to receiving a suitable bid request, the campaign control system 150 can determine or infer which ad server would likely be used to serve advertising content to the recipient (e.g. browser) associated with the received suitable bid. For example, the campaign control system 150 could determine or infer the likely ad server from information received in the bid request, information provided by the advertiser, histories of served advertising content, or combinations thereof. Suitable bid requests which are likely to engage a dysfunctional ad server can be throttled.

Figure 3:
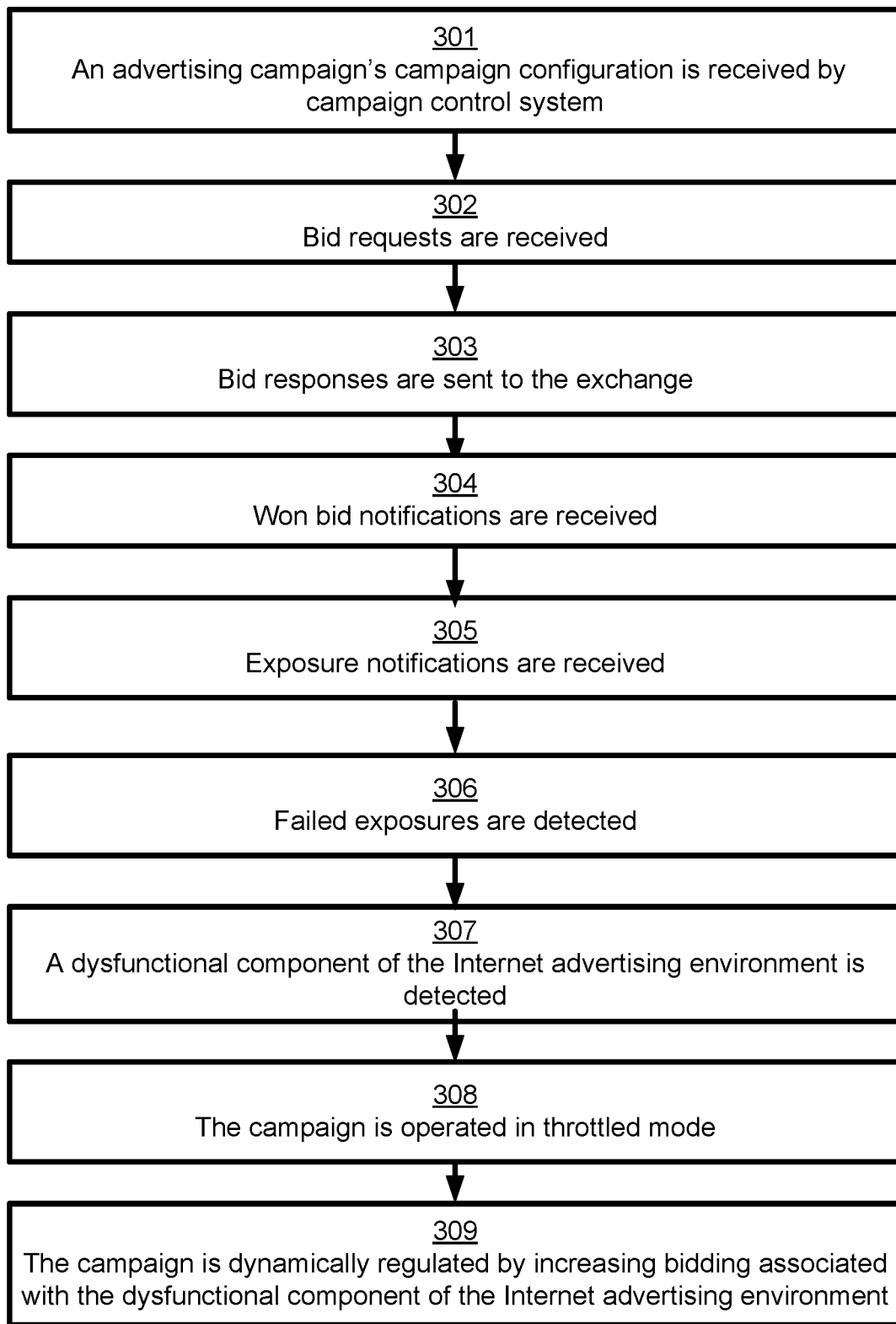
FIG. 3 is a flow chart illustrating a method of dynamically regulating advertising delivery, in accordance with an embodiment of the invention.

FIG. 3 is a flow chart illustrating a method of dynamically regulating advertising delivery, in accordance with an embodiment of the invention. In some implementations, the steps are performed in an order other than the order presented in FIG. 3, and in other implementations, additional or alternative steps may be performed.

In step 301, an advertising campaign's campaign configuration is received by campaign control system 150. For example, bid configuration module 151 can receive criteria for assessing the suitability of a bid request for the advertising campaign, budgetary constraints (e.g. total budget, target spend rate, target cost-per-mille (CPM), campaign duration), campaign goals (e.g. target reach) or combinations thereof.

In step 302, bid requests are received. For example, bid requests can be received from an exchange, such as exchange 130, in a real-time bidding environment. For example, bidding module 152 can receive a stream of bid requests and determine which bid requests are suitable for the campaign according to the criteria received by the bid configuration module 151. Each bid request is associated with a respective publisher, and the stream of bid requests comprises bid requests associated with a plurality of different publishers.

In step 303, bid responses are sent to the exchange. For example, bidding module 152 can send bid responses to the exchange for at least some of the suitable bid requests, according to budget constraints.

In step 304, won bid notifications are received. For example, each time a bid response is successful (e.g. wins an auction at the exchange), a won bid notification may be sent from the exchange and received at the campaign control system 150. For example, correlation module 153 can receive the won bid notifications and may store the won bid notifications in a database, such as database 155.

In step 305, exposure notifications are received. For example, for each successful advertising exposure, an exposure notification can be received at the campaign control system 150. Each exposure notification may be sent from the respective recipient of the advertising content (e.g. browser 110) to the correlation module 153 and may be stored in database 155.

In step 306, failed exposures are detected. For example, correlation module 153 may detect a failed exposure by detecting a won bid notification without a corresponding exposure notification.

In step 307 a dysfunctional component of the Internet advertising environment is detected. For example, a dysfunctional publisher is an example of a dysfunctional component of the Internet advertising environment. For example, correlation module 153 may compare failed exposures associated with a particular publisher or set of publishers (e.g. a publisher network) to a threshold. In an example, the correlation module 153 may detect that the ratio of the number of failed exposures associated with a particular publisher compared to the total number of won bids associated with that particular publisher exceeds a threshold, and determine that the particular publisher is dysfunctional. Other types of thresholds may be used to detect a dysfunctional component of the Internet advertising environment. For example, a threshold may comprise a total number of failed exposures within a time window.

In step 308, responsive to detecting a dysfunctional component of the Internet advertising environment, the campaign is operated in a throttled mode and bidding activity with respect to the dysfunctional component of the Internet advertising environment is reduced, but not stopped. For example, throttle module 154 can send additional constraints to the bidding module 152 to limit bidding associated with the dysfunctional publisher. For example, in the unthrottled mode, the bidding module 152 may programmatically respond to suitable bid requests from an exchange according to a campaign configuration constraint (e.g. bid on enough suitable bid requests to meet a budget goal, bid on enough suitable bid requests to meet a reach goal); accordingly, a campaign operating in an unthrottled mode may respond to some, but not all, of the suitable bid requests, mediated by the campaign configuration. In the throttled mode, the bidding activity (e.g. number of bids) associated with a dysfunctional publisher is further constrained. For example, in the throttled mode, the campaign may only bid on a fraction of the bid requests associated with the dysfunctional publisher that it bids on when operating in the unthrottled mode. In another example, in the throttled mode, the number of times a campaign may bid on bid requests associated with a dysfunctional publisher may be limited by frequency (e.g. bid on no more than five bid requests from the dysfunctional publisher per hour), cost (e.g. spend no more than one dollar per hour on bid requests associated with the dysfunctional publisher), or both. In the throttled mode, some, but not all, of the suitable bid requests associated with the dysfunctional component can be purposely ignored, to reduce, but not eliminate, bidding related to a dysfunctional publisher. In some cases, when possible, the bidding module may bid on more bid requests associated with properly functioning publishers (i.e. publishers that are not known to be dysfunctional) to offset the impact of the throttled bidding associated with the dysfunctional publisher on meeting campaign goals.

In step 309, responsive to detecting successful exposures associated with the dysfunctional publisher in throttled mode, the campaign is dynamically regulated by increasing the bidding associated with the dysfunctional component of the Internet environment (e.g. the dysfunctional publisher). For example, correlation module 153 may detect successful exposures associated with the dysfunctional publisher and the throttle module 154 can send an update to the bidding module 152 directing the bidding module 152 to increase bidding associated with the dysfunctional publisher. For example, by increasing the bidding associated with the dysfunctional publisher in the throttled mode, the campaign may bid on a larger fraction of the bid requests associated with the dysfunctional publisher that it did in step 306. In another example, the number of times a campaign may bid on bid requests associated with a dysfunctional publisher may be increased, but still limited by quantity (e.g. bid on no more than ten bid requests from the dysfunctional publisher per hour), cost (e.g. spend no more than five dollars per hour on bid requests associated with the dysfunctional publisher), or both. In some cases, responsive to detecting enough successful exposures (e.g. the number of successful exposures exceeds a threshold), the campaign operation may be returned to normal operation and the bidding module 152 may programmatically respond to suitable bid requests from an exchange according to a campaign configuration constraint (e.g. bid on enough suitable bid requests to meet a budget goal, bid on enough suitable bid requests to meet a reach goal).

Dynamic Regulation in an Environment with a Multiple Exchanges

Although only a single exchange 130 is illustrated in FIG. 1, the Internet advertising environment can comprise multiple exchanges 130. A campaign control system 150 can operate with respect to multiple exchanges, receiving a stream of bid requests from each respective exchange. FIG. 3 illustrates an example of the operation of a campaign control system 150 to dynamically regulate the operation of an advertising campaign with respect to dysfunctional component of the Internet advertising environment, a dysfunctional publisher. In an example, the campaign control system 150 can similarly regulate the operation of an advertising campaign with respect to a different dysfunctional component of the Internet advertising environment, a dysfunctional exchange.

For example, instead of detecting a dysfunctional publisher (as described with respect to step 307), the correlation module 153 of the campaign control system 150 can detect a different component of the Internet advertising environment, namely a dysfunctional exchange 130. Instead of throttling a dysfunctional publisher (as described with respect to step 308), responsive to detecting a dysfunctional advertising creative, the throttle module 154 can reduce bidding on bid requests originating from the dysfunctional exchange responsive to detecting the dysfunctional exchange. Advantageously, the campaign control system 150 can continue to operate the campaign normally with respect to bid requests originating from the other, properly functioning exchanges in the Internet advertising environment.

Dynamic Regulation with Multiple Campaigns

The campaign control system 150 may operate a plurality of campaigns simultaneously on behalf of a plurality of advertisers. FIG. 3 illustrates an example of the operation of a campaign control system 150 to dynamically regulate the operation of an advertising campaign with respect to dysfunctional component of the Internet advertising environment, a dysfunctional publisher. In an example, the campaign control system 150 can similarly regulate the operation of a dysfunctional advertising campaign. In some cases, an advertising campaign may be improperly configured, leading to a dysfunctional advertising campaign. The campaign control system 150 can be used to dynamically regulate the operation of an advertising campaign. For example, instead of detecting a dysfunctional publisher (as described with respect to step 307), the correlation module 153 of the campaign control system 150 can detect a dysfunctional advertising campaign. Instead of throttling a dysfunctional publisher (as described with respect to step 308), responsive to detecting a dysfunctional advertising creative, the throttle module 154 can reduce bidding behalf of the dysfunctional campaign.

The campaign control system 150 may dynamically regulate operation of the campaign by increasing the bidding associated with the dysfunctional campaign, responsive to detecting successful exposures associated with the dysfunctional campaign in the same way that bidding can be restored with respect to the dysfunctional publisher as described in step 309.

Furthermore, in some embodiments, a campaign control system 150 may dynamically regulate the operation of some or all of the campaigns it operates with respect to a dysfunctional component of the Internet advertising environment. For example, responsive to detecting a dysfunctional component of the Internet advertising environment (e.g. recipient, browser 110, advertising creative, publisher 120, exchange 130, ad server 140), the campaign control system 150 may throttle bidding associated with the dysfunctional component of the Internet advertising environment across other campaigns operated by the campaign control system 150, even if no failed exposures were ever detected for those other campaigns. Similarly, responsive to detecting successful exposures associated with the dysfunctional component of the Internet advertising environment (e.g. a dysfunctional publisher) for a first campaign, the campaign control system 150 may restore bidding with respect to the dysfunctional component of the advertising environment and for other campaigns operated by the campaign control system 150, even if the successful exposures were not associated with the other campaigns.

As previously mentioned, a campaign control system 150 may operate a plurality of campaigns on behalf of a plurality of publishers. In some cases, the campaign control system 150 can detect failed exposures associated with a component of the Internet advertising environment (e.g. recipient, browser 110, advertising creative, publisher 120, exchange 130, ad server 140) across a plurality of campaigns. In some cases, a dysfunctional component of the Internet advertising environment may be determined by aggregating the failed exposures across a plurality of campaigns (e.g. aggregate all failed exposures associated with a particular publisher within a time window, aggregate all failed exposures associated with a particular exchange for concurrently operating campaigns) and comparing the aggregate volume of failed exposures to a threshold. Similarly, the campaign control system 150 may determine that a component of the Internet advertising environment is recovering by aggregating successful exposures across a plurality of campaigns. Advantageously, this enables the campaign control system 150 to rapidly diagnose dysfunctional components of the Internet advertising environment and also rapidly detect recovery.

Dynamic Regulation with Multiple Creatives

FIG. 3 illustrates an example of the operation of a campaign control system 150 to dynamically regulate the operation of an advertising campaign with respect to a dysfunctional component of the Internet advertising environment, a dysfunctional publisher. In an example, the campaign control system 150 can similarly regulate the operation of an advertising campaign with respect to a different dysfunctional component of the Internet advertising environment, a dysfunctional advertising creative.

In some cases, an advertising campaign can make use of a plurality of advertising creatives. For example, the same advertising creative may be distributed to a plurality of different ad servers which are geographically distributed to reduce ad serving latency. In an example, different creatives may be generated to suit different ad slot geometries (e.g. one creative generated for a "banner" ad slot that is short and wide, a different creative generated for a "skyscraper" ad slot that is tall and narrow). In some cases, a variety of different creatives may be developed to appeal to different intended recipients (e.g. according to the inferred demographics, geolocation, browsing history, or purchase history of the intended recipient).

The campaign control system 150 can be used to dynamically regulate the operation of an advertising campaign with respect to dysfunctional creatives. For example, instead of detecting a dysfunctional publisher (as described with respect to step 307), the correlation module 153 of the campaign control system 150 can detect a dysfunctional advertising creative. Instead of throttling a dysfunctional publisher (as described with respect to step 308), responsive to detecting a dysfunctional advertising creative, the throttle module 154 can reduce bidding on bid requests associated with ad slots that are likely to require the dysfunctional advertising creative.

For example, if an advertising campaign has three different advertising creatives (e.g. a first creative optimized for an urban recipient, a second creative optimized for a rural recipient, and a third creative optimized for a suburban recipient), a skyscraper creative and a pop-over ad creative), and the correlation module 153 determines that the urban-optimized ad creative is dysfunctional, the throttle module 154 may instruct the bidding module 152 to throttle bidding on bid requests representing an ad slot with an intended recipient (e.g. browser 110) which is likely to be located in an urban area.

In an example, if an advertising campaign has three different advertising creatives (e.g. a banner ad creative, a skyscraper creative and a pop-over ad creative), and the correlation module 153 determines that the banner ad creative is dysfunctional, the throttle module 154 may instruct the bidding module 152 to throttle bidding on bid requests representing an ad slot with a banner ad geometry.

In an example, if an advertising creative is customized by inferred demographic (e.g. one creative is optimized for teens, a second creative is optimized for adults, and a third creative is optimized for senior citizens), and the correlation module 153 determines that the third creative is dysfunctional, the throttle module 154 may instruct the bidding module 152 to throttle bidding on bid requests associated with an entity (e,g, a browser) inferred to be a senior citizen.

In these examples, the campaign control system 150 may dynamically regulate operation of the campaign by increasing the bidding associated with the dysfunctional advertising creative, responsive to detecting successful exposures associated with the dysfunctional advertising creative, in the same way that bidding can be restored with respect to the dysfunctional publisher as described in step 309.

Dynamic Regulation with Multiple Ad Servers

Although only a single ad server 140 is illustrated in FIG. 1, the Internet advertising environment can comprise multiple ad servers 140. A campaign control system 150 can operate with respect to multiple ad servers 140. FIG. 3 illustrates an example of the operation of a campaign control system 150 to dynamically regulate the operation of an advertising campaign with respect to a dysfunctional component of the Internet advertising environment, a dysfunctional publisher. In an example, the campaign control system 150 can similarly regulate the operation of an advertising campaign with respect to a different dysfunctional component of the Internet advertising environment, a dysfunctional ad server.

For example, instead of detecting a dysfunctional publisher (as described with respect to step 307), the correlation module 153 of the campaign control system 150 can detect a dysfunctional ad server 140. Instead of throttling bidding with respect to a dysfunctional publisher (as described with respect to step 308), responsive to detecting a dysfunctional advertising creative, the throttle module 154 can reduce bidding on bid requests which are expected to invoke a dysfunctional ad server responsive to detecting the dysfunctional ad server. In an example, a campaign may be configured with multiple ad servers, each serving a different type of advertising content (e.g. video ad server, image ad server, etc.). In the event that the campaign control system 150 detects a dysfunctional video ad server, bidding on bid requests representing ad slots for video ads may be throttled for the campaign (or campaigns) which would require the dysfunctional ad server to serve their video ads. The campaign control system 150 may dynamically regulate operation of the campaign (or campaigns) by increasing the bidding associated with the dysfunctional ad server, responsive to detecting successful exposures associated with the dysfunctional ad server, in the same way that bidding can be restored with respect to the dysfunctional publisher as described in step 309.

Dynamic Regulation with Dysfunctional Entities

Recipients, such as browsers 110, may not display advertising content for a variety of reasons. For example, a browser equipped with an ad-blocker may not display advertising content. In some cases, a recipient may be intermittently dysfunctional, and the failure to display advertising content can be temporary. In an example, the campaign control system 150 can regulate the operation of an advertising campaign with respect to a dysfunctional recipient, such as a browser.

For example, instead of detecting a dysfunctional publisher (as described with respect to step 307), the correlation module 153 of the campaign control system 150 can detect a dysfunctional recipient, such as browser 110. Instead of throttling bidding with respect to a dysfunctional publisher (as described with respect to step 308), responsive to detecting a dysfunctional advertising creative, the throttle module 154 can reduce bidding on bid requests representing advertising opportunities with the dysfunctional browser 110 as the intended recipient of the advertising content. Advantageously, the campaign control system 150 can continue to operate the campaign (or campaigns) normally with respect to bid requests representing other, properly functioning recipients (e.g. browser 110) in the Internet advertising environment.

Physical Components of a Computer

Figure 4:
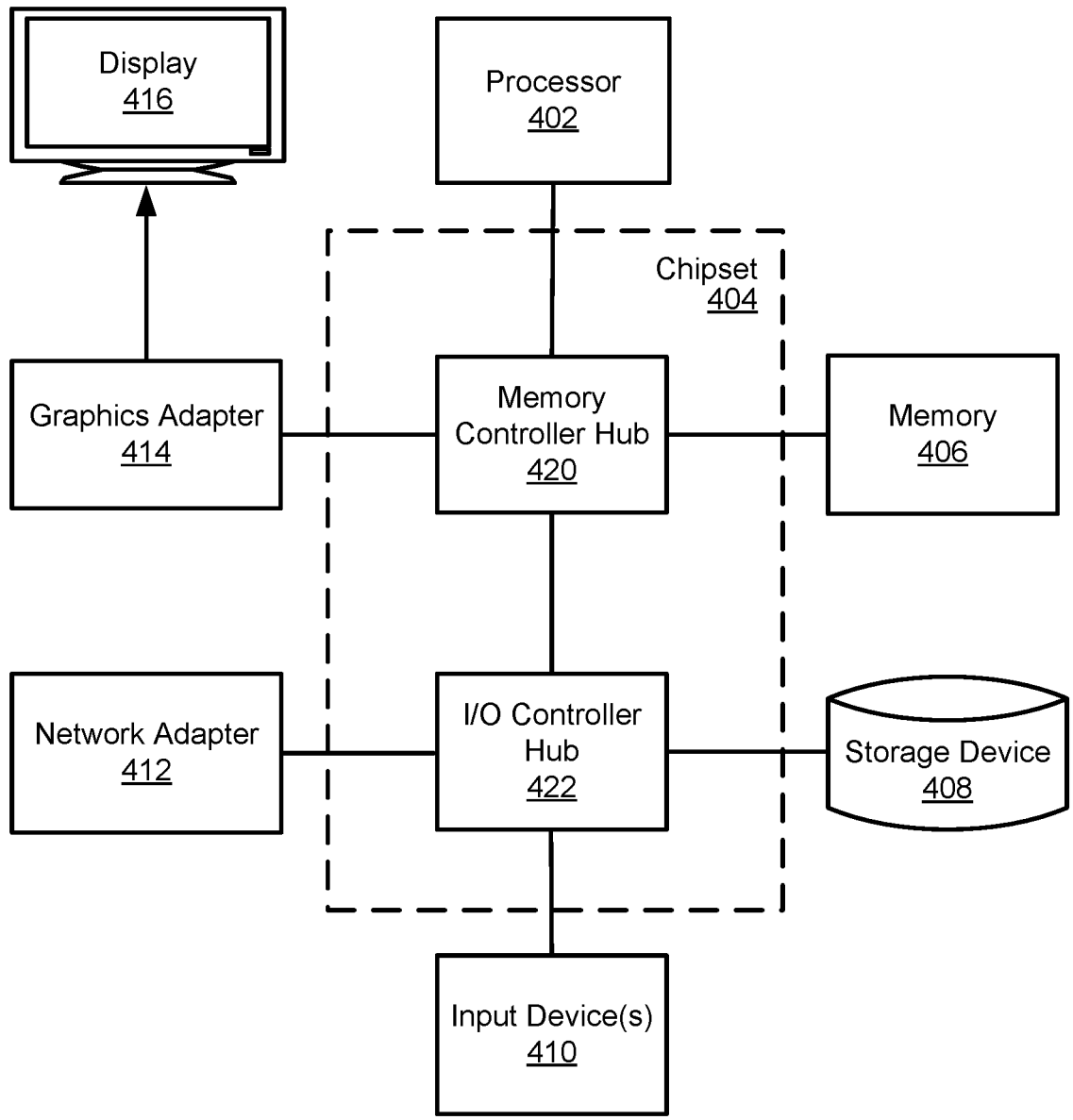
FIG. 4 is a high-level block diagram of the components of a computing system for use, for example, as a browser, a publisher, an exchange, an ad server, or a campaign control system depicted in FIG. 1, in accordance with an embodiment of the invention.

FIG. 4 is a high-level block diagram of the components of a computing system 400 for use, for example, as a browser 110, a publisher 120, an exchange 130, an ad server 140, or a campaign control system 150 depicted in FIG. 1, in accordance with an embodiment. Illustrated are at least one processor 402 coupled to a chipset 404. Also coupled to the chipset 404 are a memory 406, a storage device 408, input device(s) 410, a network adapter 412, and a graphics adapter 414. A display 416 is coupled to the graphics adapter 414. In one embodiment, the functionality of the chipset 404 is provided by a memory controller hub 420 and an I/O controller hub 422. In another embodiment, the memory 406 is coupled directly to the processor 402 instead of the chipset 404.

The processor 402 is the hardware logic circuitry of the computer 400 that processes instructions such as computer programs to operate on data. The memory 406 holds instructions and data used by the processor 402. The storage device 408 is any non-transitory computer-readable storage medium, such as a hard drive, compact disk read-only memory (CD-ROM), DVD, or a solid-state memory device. The input devices(s) 410 may be a keyboard, mouse, track ball, touch-sensitive screen and/or another type of pointing device to input data into the computer 400. The network adapter 412 couples the computer 400 to a network. The graphics adapter 414 displays images and other information on the display 416.

As is known in the art, a computer 400 can have different and/or other components than those shown in FIG. 4. In addition, the computer 400 can lack certain illustrated components. In one embodiment, a computer 400 acting as a server may lack an input device 410, a graphics adapter 414, and/or a display 416. Moreover, the storage device 408 can be local and/or remote from the computer 400 (such as embodied within a storage area network (SAN)).

As is known in the art, the computer 400 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software (e.g. computer code), firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A computer-implemented method, comprising:
   determining, by a campaign control system, that an element of an internet advertising system is a dysfunctional element of the internet advertising system, comprising:
   receiving, by the campaign control system, bid requests from an exchange, the bid requests representing opportunities to expose browsers to content by a publisher;
   returning, by the campaign control system, bid responses to the exchange, the bid responses corresponding to the received bid requests, wherein the time passage between receiving bid requests and returning bid responses is milliseconds, the bid responses comprising an ad redirect, the ad redirect comprising instructions for each recipient browser to send an exposure notification identifier to the campaign control system;

receiving, by the campaign control system, won bid notifications from the exchange, each won bid notification comprising an won bid identifier;

receiving, by the campaign control system, exposure notification identifiers from exposed browsers, each exposure notification identifier corresponding to a respective won bid notification identifier;

detecting, by the campaign control system, failed exposures by detecting won bid notification identifiers without corresponding exposure notification identifiers;

determining, by the campaign control system, that the element of the internet advertising system is the dysfunctional element of the internet advertising system by determining that a volume of failed exposures associated with the element of the internet advertising system exceeds a first threshold; and responsive to determining that the element of the internet advertising system is the dysfunctional element of the internet advertising system, automatically regulating the campaign, by the campaign control system, comprising:

operating the campaign in a throttled mode by returning bid responses associated with the dysfunctional element of the internet advertising system at a reduced frequency;

determining, by the campaign control system, that the dysfunctional element of the internet advertising system has become a recovered element of the internet advertising system by determining that the volume of failed exposures associated with the dysfunctional element of the internet advertising system falls below a second threshold; and responsive to determining that the dysfunctional element of the internet advertising system is the recovered element of the internet advertising system, operating the campaign in a recovered mode by returning bid responses associated with the recovered element of the internet advertising system at a frequency greater than the reduced frequency.

2. The method of claim 1, wherein the element of the internet advertising system is one of a campaign, a recipient, an advertising creative, an exchange, and an ad server.

3. The method of claim 2, wherein the recipient is a device.

4. The method of claim 2, wherein the recipient is an application executing on a device.

5. The method of claim 2, wherein the recipient is a browser.

6. The method of claim 1, wherein:
returning bid responses to the exchange comprises returning bid responses to a first fraction of bid requests;
operating the campaign in the throttled mode further comprises returning bid responses to a second fraction of bid requests associated with the dysfunctional element of the internet advertising system, wherein the second fraction is a non-zero fraction smaller than the first fraction; and
operating the campaign in the recovered mode further comprises returning bid responses to a third fraction of bid requests associated with the recovered element of the internet advertising system, wherein the third fraction is larger than the second fraction.

7. The method of claim 1 further comprising:
operating a second campaign; and
responsive to determining that the dysfunctional element of the internet advertising system is the dysfunctional element of the internet advertising system, operating the second campaign in the throttled mode by returning bid responses associated with the dysfunctional element of the internet advertising system at the reduced frequency on behalf of the second campaign.

8. A non-transitory computer-readable storage medium storing processor-executable computer program instructions that, when executed, cause a computer processor to perform a method, the method comprising:

determining, by a campaign control system, that an element of an internet advertising system is a dysfunctional element of the internet advertising system, comprising:

receiving, by the campaign control system, bid requests from an exchange, the bid requests representing opportunities to expose browsers to content by a publisher;

returning, by the campaign control system, bid responses to the exchange, the bid responses corresponding to the received bid requests, wherein the time passage between receiving bid requests and returning bid responses is milliseconds, the bid responses comprising an ad redirect, the ad redirect comprising instructions for each recipient browser to send an exposure notification identifier to the campaign control system;

receiving, by the campaign control system, won bid notifications from the exchange, each won bid notification comprising an won bid identifier;

receiving, by the campaign control system, exposure notification identifiers from exposed browsers, each exposure notification identifier corresponding to a respective won bid notification identifier;

detecting, by the campaign control system, failed exposures by detecting won bid notification identifiers without corresponding exposure notification identifiers;

determining, by the campaign control system, that the element of the internet advertising system is the dysfunctional element of the internet advertising system by determining that a volume of failed exposures associated with the element of the internet advertising system exceeds a first threshold; and responsive to determining that the element of the internet advertising system is the dysfunctional element of the internet advertising system, automatically regulating the campaign, by the campaign control system, comprising:

operating the campaign in a throttled mode by returning bid responses associated with the dysfunctional element of the internet advertising system at a reduced frequency;

determining, by the campaign control system, that the dysfunctional element of the internet advertising system has become a recovered element of the internet advertising system by determining that the volume of failed exposures associated with the dysfunctional element of the internet advertising system falls below a second threshold; and responsive to determining that the dysfunctional element of the internet advertising system is the recovered element of the internet advertising system, operating the campaign in a recovered mode by returning bid responses associated with the recovered element of the internet advertising system at a frequency greater than the reduced frequency.

9. The medium of claim 8, wherein the element of the internet advertising system is one of a campaign, a recipient, an advertising creative, an exchange, and an ad server.

10. The method of claim 9, wherein the recipient is a device.

11. The medium of claim 9, wherein the recipient is an application executing on a device.

12. The medium of claim 9, wherein the recipient is a browser.

13. The medium of claim 8, wherein:
returning bid responses to the exchange comprises returning bid responses to a first fraction of bid requests;
operating the campaign in the throttled mode further comprises returning bid responses to a second fraction of bid requests associated with the dysfunctional element of the internet advertising system, wherein the second fraction is a non-zero fraction smaller than the first fraction; and
operating the campaign in the recovered mode further comprises returning bid responses to a third fraction of bid requests associated with the recovered element of the internet advertising system, wherein the third fraction is larger than the second fraction.

14. The medium of claim 8, wherein the method further comprises:
operating a second campaign; and
responsive to determining that the dysfunctional element of the internet advertising system is the dysfunctional element of the internet advertising system, operating the second campaign in the throttled mode by returning bid responses associated with the dysfunctional element of the internet advertising system at the reduced frequency on behalf of the second campaign.

15. A system comprising:
a processor; and
a non-transitory computer-readable storage medium storing processor-executable computer program instructions that, when executed, cause a computer processor to perform a method, the method comprising:
determining, by a campaign control system, that an element of an internet advertising system is a dysfunctional element of the internet advertising system, comprising:
receiving, by the campaign control system, bid requests from an exchange, the bid requests representing opportunities to expose browsers to content by a publisher;
returning, by the campaign control system, bid responses to the exchange, the bid responses corresponding to the received bid requests, wherein the time passage between receiving bid requests and returning bid responses is milliseconds, the bid responses comprising an ad redirect, the ad redirect comprising instructions for each recipient browser to send an exposure notification identifier to the campaign control system;
receiving, by the campaign control system, won bid notifications from the exchange, each won bid notification comprising an won bid identifier;
receiving, by the campaign control system, exposure notification identifiers from exposed browsers, each exposure notification identifier corresponding to a respective won bid notification identifier;
detecting, by the campaign control system, failed exposures by detecting won bid notification identifiers without corresponding exposure notification identifiers;
determining, by the campaign control system, that the element of the internet advertising system is the dysfunctional element of the internet advertising system by determining that a volume of failed exposures associated with the element of the internet advertising system exceeds a first threshold; and
responsive to determining that the element of the internet advertising system is the dysfunctional element of the internet advertising system, automatically regulating the campaign, by the campaign control system, comprising:
operating the campaign in a throttled mode by returning bid responses associated with the dysfunctional element of the internet advertising system at a reduced frequency;
determining, by the campaign control system, that the dysfunctional element of the internet advertising system has become a recovered element of the internet advertising system by determining that the volume of failed exposures associated with the dysfunctional element of the internet advertising system falls below a second threshold; and
responsive to determining that the dysfunctional element of the internet advertising system is the recovered element of the internet advertising system, operating the campaign in a recovered mode by returning bid responses associated with the recovered element of the internet advertising system at a frequency greater than the reduced frequency.

16. The system of claim 15, wherein the element of the internet advertising system is one of a campaign, a recipient, an advertising creative, an exchange, and an ad server.

17. The system of claim 16, wherein the recipient is a device.

18. The system of claim 16, wherein the recipient is an application executing on a device.

19. The system of claim 16, wherein the recipient is a browser.

20. The system of claim 15, wherein:
returning bid responses to the exchange comprises returning bid responses to a first fraction of bid requests;
operating the campaign in the throttled mode further comprises returning bid responses to a second fraction of bid requests associated with the dysfunctional element of the internet advertising system, wherein the second fraction is a non-zero fraction smaller than the first fraction; and
operating the campaign in the recovered mode further comprises returning bid responses to a third fraction of bid requests associated with the recovered element of the internet advertising system, wherein the third fraction is larger than the second fraction.

21. The system of claim 15, wherein the method further comprises:
operating a second campaign; and
responsive to determining that the dysfunctional element of the internet advertising system is the dysfunctional element of the internet advertising system, operating the second campaign in the throttled mode by returning bid responses associated with the dysfunctional element of the internet advertising system at the reduced frequency on behalf of the second campaign.

* * * * *